United States Patent
Betz et al.

[11] Patent Number: 6,145,480
[45] Date of Patent: Nov. 14, 2000

[54] TURBOCHARGED ENGINE COOLING SYSTEM WITH TWO TWO-PASS RADIATORS

[75] Inventors: Michael D. Betz, Knoxville; Jiubo Ma, Dunlap, both of Ill.

[73] Assignee: Caterpillar Inc., Peoria, Ill.

[21] Appl. No.: 09/201,099

[22] Filed: Nov. 30, 1998

[51] Int. Cl.[7] .................................... F01P 3/20
[52] U.S. Cl. ........................................ 123/41.51
[58] Field of Search ..................... 123/41.51, 563; 60/599

[56] References Cited

U.S. PATENT DOCUMENTS

| | | | |
|---|---|---|---|
| 1,066,714 | 7/1913 | Daimler | 123/41.51 |
| 1,236,813 | 8/1917 | Zimmerman | |
| 1,653,603 | 12/1927 | Schroder | 123/41.51 |
| 1,979,732 | 11/1934 | Carson, Jr. | |
| 3,134,371 | 5/1964 | Crooks | 123/41.31 |
| 3,425,400 | 2/1969 | Scherenberg | 123/41.51 |
| 3,752,132 | 8/1973 | Bentz et al. | 123/119 CD |
| 3,872,835 | 3/1975 | Deutschmann | 123/41.31 |
| 4,287,961 | 9/1981 | Steiger | 180/68 R |
| 4,348,991 | 9/1982 | Stang et al. | 123/41.29 |
| 4,513,695 | 4/1985 | Patchen, II | 123/41.1 |
| 4,550,692 | 11/1985 | Crofts, Sr. | 123/41.1 |
| 4,620,509 | 11/1986 | Crofts | 123/41.1 |
| 4,621,594 | 11/1986 | Kubis | 123/41.09 |
| 4,787,445 | 11/1988 | Howcroft | 165/104.32 |
| 5,201,285 | 4/1993 | McTaggart | 123/41.31 |
| 5,669,338 | 9/1997 | Pribble et al. | 123/41.29 |

FOREIGN PATENT DOCUMENTS

| | | |
|---|---|---|
| 0 126 620 A2 | 11/1984 | European Pat. Off. |
| 2 164 740 | 3/1986 | United Kingdom |

*Primary Examiner*—Willis R. Wolfe
*Assistant Examiner*—Jason Benton
*Attorney, Agent, or Firm*—John L. Rogitz

[57] ABSTRACT

An engine cooling system includes a primary two-pass radiator, a jacket water pump pumping coolant from the primary radiator to the engine, and a secondary radiator receiving coolant from the primary radiator in parallel with the engine. An after cooler for cooling engine charge air from a turbo charger receives coolant from the secondary radiator, and water is circulated to the after cooler by a SCAC pump. A shunt tank is connected to the suction of the jacket water pump to establish a static pressure head thereon, to ensure that the jacket water pump has sufficient suction pressure despite relatively high coolant head loss through the two-pass primary radiator.

20 Claims, 2 Drawing Sheets

TURBOCHARGED ENGINE COOLING SYSTEM WITH TWO TWO-PASS RADIATORS

TECHNICAL FIELD

The present invention relates generally to engine cooling systems, and more particularly to turbocharged engine cooling systems having aftercoolers.

BACKGROUND ART

The operation of heavy mechanical equipment such as large tractors generates considerable heat in the engines of the equipment, which must be efficiently dissipated to prevent damage to the engine. This is generally accomplished by coolant-based radiator systems, in which a pump circulates coolant through tubes in a radiator. Air cools the tubes and, hence, the coolant, and the coolant is then pumped through various engine components, e.g., an engine oil cooler, to cool these components.

As recognized herein, many engines of heavy equipment are turbocharged. Turbochargers generate charge air for the engine which is used in the combustion process. To reduce engine emissions, the temperature of the charge air from the turbocharger should be minimized, and aftercoolers have been provided for this purpose. Coolant from the radiator can be used to cool the turbocharged air passing through an aftercooler.

Thus, it is important to minimize coolant temperature at normal operating conditions, both to effectively cool engine components and to reduce emissions in turbocharged engines. As recognized herein, however, it is further important to provide appropriate coolant flow rates at light loads, i.e., when the engine generates relatively little heat. The present invention under-stands that both of these problems can be addressed in a manner that is superior to that provided by existing cooling systems.

DISCLOSURE OF THE INVENTION

A cooling system for an engine includes a first radiator having a coolant outlet and a second radiator having a coolant inlet in communication with the coolant outlet of the first radiator. The second radiator also has a coolant outlet, and coolant is passed in series from the first radiator to the second radiator. An aftercooler having at least one coolant inlet is in communication with the coolant outlet of the second radiator, with a pump communicating with the first radiator for pumping coolant to the engine.

In another aspect, a cooling system for an engine of a vehicle includes a first radiator, a JW pump discharging coolant from the first radiator to the engine, and a second radiator. The second radiator is in parallel with the engine, and the second radiator receives coolant from the first radiator. An aftercooler is in series with the second radiator for receiving coolant therefrom, with the aftercooler discharging coolant back to the first radiator.

In still another aspect, a method is disclosed for cooling an engine and an aftercooler that cools charge air for the engine. The method includes pumping coolant from a primary radiator to the engine, and causing coolant from the primary radiator to flow in series through a secondary radiator and the aftercooler to cool charge air from a turbocharger.

The details of the present invention, both as to its structure and operation, can best be understood in reference to the accompanying drawings, in which like reference numerals refer to like parts.

BEST MODE FOR CARRYING OUT THE INVENTION

Figure 1:
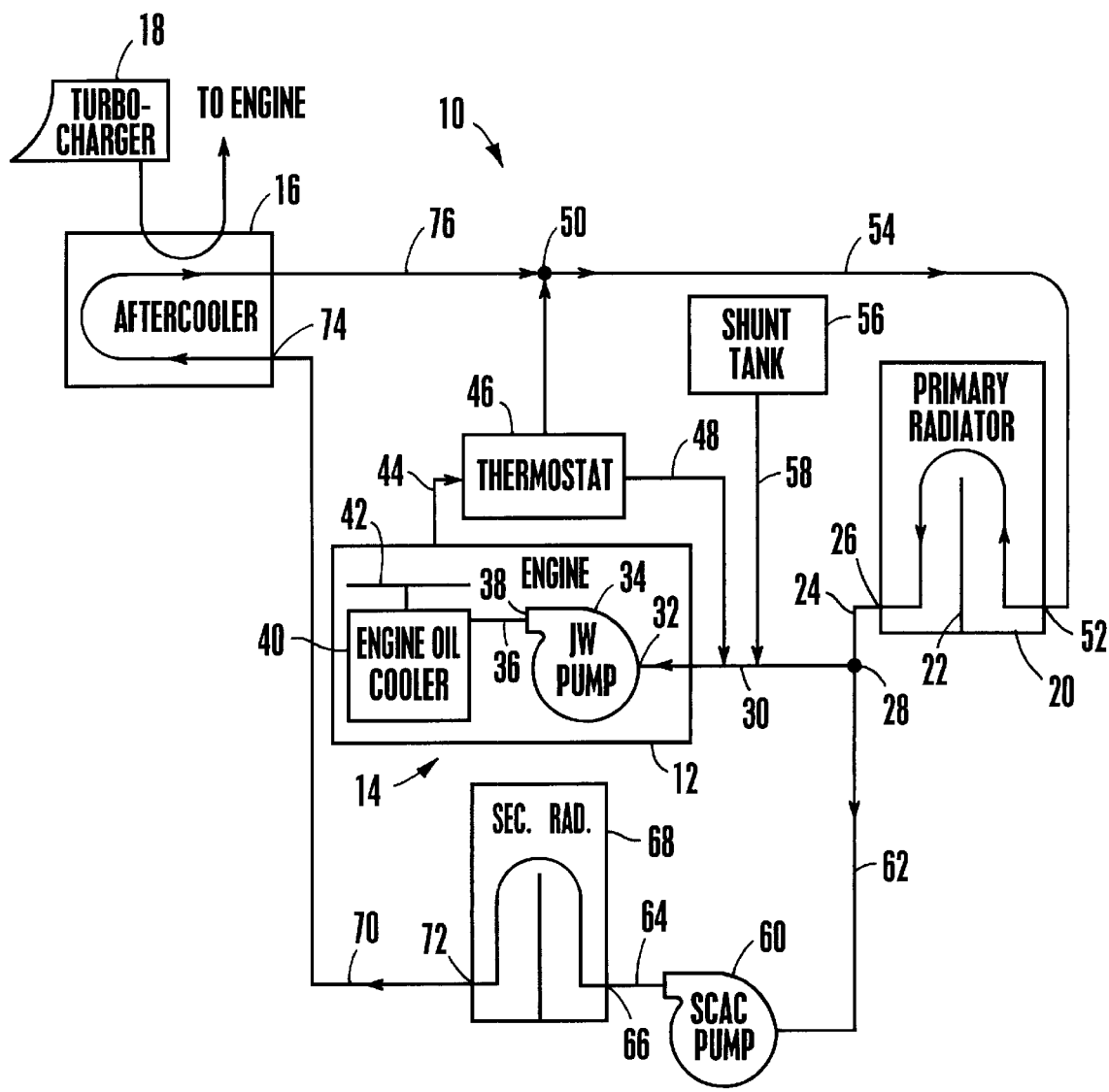
FIG. 1 is a schematic diagram of the present cooling system, in which SCAC pump takes a suction on the outlet of the first radiator and discharges coolant to the inlet of the second radiator.

Referring now to FIG. 1, a cooling system is shown, generally designated 10, for cooling an engine 12 of a vehicle, generally designated 14, and also for cooling a turbocharger aftercooler 16. In accordance with principles known in the art and as indicated in FIG. 1, the aftercooler 16 cools air from the turbocharger 18 prior to the air being injected as charge air into the engine 14. Preferably, the aftercooler 16 is a two-pass aftercooler made by the present assignee.

The system 10 includes a primary radiator 20 having tubes through which coolant flows, with the outside surfaces of the tubes being exposed to air to cool the coolant in the tubes. In the preferred embodiment, the radiator 20 is a two-pass radiator that can have multiple cores or cooling elements 22 (only one core or cooling element 22 shown). In a particularly preferred embodiment, the primary radiator 20 is established by at least a portion of a radiator marketed by the present assignee under the trademark "AMOCS". By "two-pass" is meant that coolant flowing through the radiator 20 passes across the cooling element 22 twice, as indicated in FIG. 1.

After being cooled in the primary radiator 20, coolant enters a coolant supply line 24 from an outlet 26 of the radiator 20, and the coolant flows to a coolant supply three-way junction 28. From the coolant supply three-way junction 28, the coolant flow is divided into two paths for fluid communication. The first path is established by a JW pump suction line 30, through which coolant flows to a suction port 32 of a centrifugal-type jacket water (JW) pump 34. The JW pump discharges coolant into a JW pump discharge line 36 through a JW pump discharge port 38, and the coolant then flows to an engine oil cooler 40 of the engine 12 and thence to other engine components 42, to cool the oil cooler 40 and components 42 in accordance with well-understood principles. The coolant then exits the engine 12 via an engine return line 44.

From the engine return line 44, the coolant flows to a thermostat 46 that directs coolant into both an engine recirculation line 48 and toward a coolant return three-way junction 50. As shown, the engine recirculation line 48 establishes a path for fluid communication directly back to the suction of the JW pump 34, whereas coolant passing through the coolant return three-way junction 50 enters a primary radiator inlet 52 via a coolant return 54. As the skilled artisan will recognize, the position of the thermostat 46 depends on the temperature of the coolant. At lower coolant temperatures, comparatively more coolant is passed through the recirculation line 48, while at higher coolant temperatures, most if not all coolant is directed back to the radiator 20 via the coolant return line 54.

As recognized by the present invention, coolant passing through a two-pass radiator can lose a significant amount of pressure head compared to the coolant head loss in a single-pass radiator, to the extent that the suction pressure of the associated JW pump can be unacceptably low. Accordingly, a shunt tank 56 is disposed above the suction port 32 of the JW pump 34 in fluid communication therewith via a static head line 58 and the JW pump suction line 30, to provide a static pressure head at the suction of the JW pump 34. If desired, the radiator 20 can vent to the shunt tank 56 via a vent line 59.

Turning to the aftercooler 16 cooling circuit, a centrifugal-type separate circuit aftercooler (SCAC) pump 60 is in fluid communication with the coolant supply three-way junction 28 (and, hence, with the outlet 26 of the primary radiator 20) via an SCAC pump suction line 62. The SCAC pump 60 discharges coolant into a secondary radiator supply line 64, and thence to an inlet 66 of a two-pass secondary radiator 68. In other words, the SCAC pump 60 takes a suction on the outlet 26 of the primary radiator 20 and discharges coolant to the inlet 66 of the secondary radiator 68. Thus, the secondary radiator 68 is in series with the primary radiator 20, and in parallel with the engine 12 relative to the primary radiator 20.

In effect, coolant directed to the aftercooler 16 passes first through a 4-pass radiative cooling system.

If desired, the radiators 20, 68 can be enclosed in a common housing. For example, the primary radiator 20 can be established by six of eight cores in the above-disclosed Caterpillar AMOCS radiator, and the secondary radiator 68 can be established by the remaining two cores.

An aftercooler supply line 70 connects an outlet 72 of the secondary radiator 68 with an inlet 74 of the aftercooler 16. Thus, the aftercooler 16 is in series with the secondary radiator 68. Coolant exits the aftercooler 16 to an aftercooler return line 76. From the aftercooler return line 76, coolant flows to the coolant return three-way junction 50 and thence to the inlet 52 of the primary radiator 20.

Figure 2:
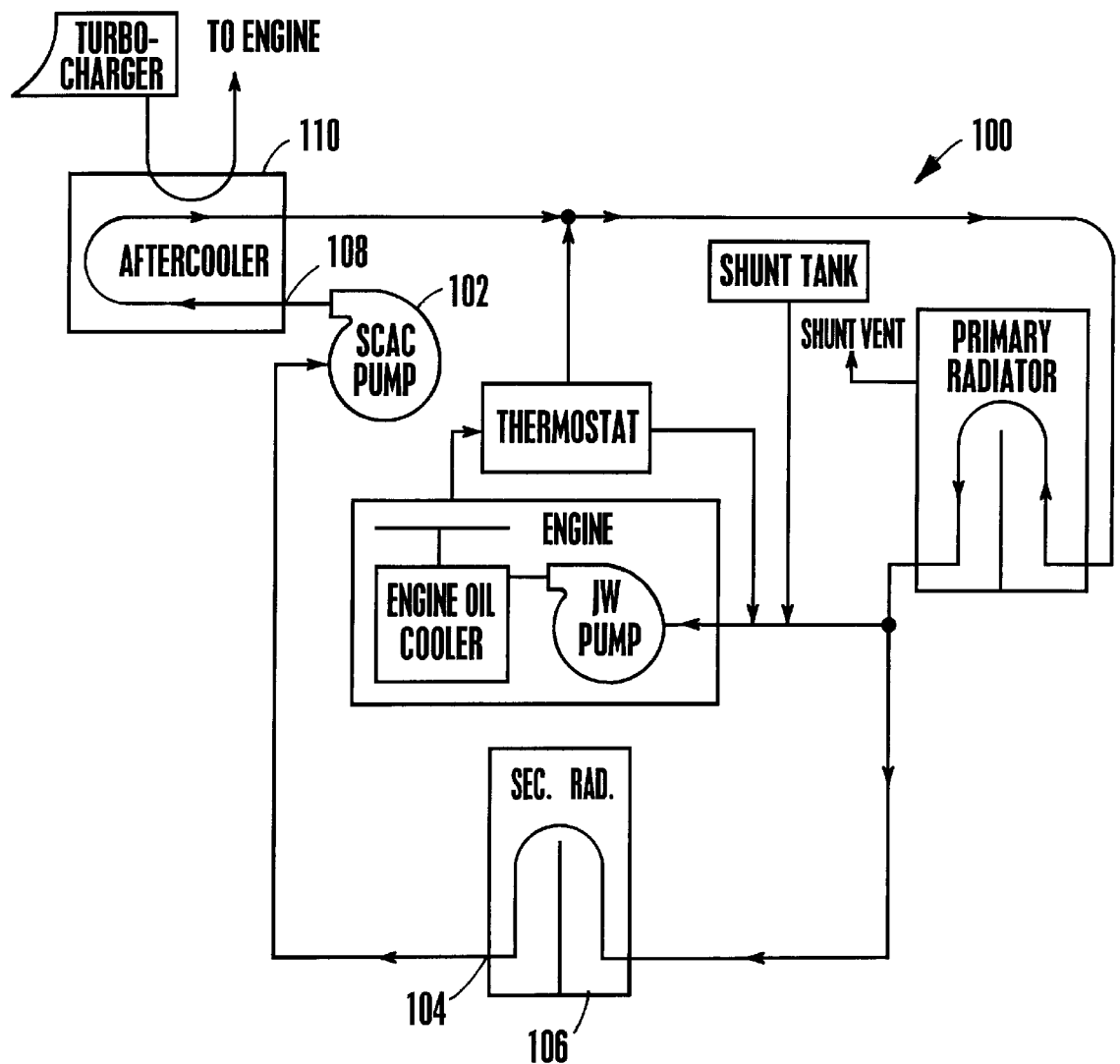
FIG. 2 is a schematic diagram of an alternate embodiment of the present cooling system, in which the SCAC pump takes a suction on the outlet of the second radiator and discharges coolant to the inlet of the aftercooler.

FIG. 2 shows a system, generally designated 100, which is in all essential respects identical in construction and operation to the system 10 shown in FIG. 1, with the following exceptions. An SCAC pump 102 takes a suction on an outlet 104 of a secondary two-pass radiator 106, and discharges coolant to an inlet 108 of an aftercooler 110.

INDUSTRIAL APPLICABILITY

With the above disclosure in mind, the secondary radiator 68 further cools coolant to achieve low inlet coolant temperatures to the aftercooler 16 and, hence, to reduce emissions. This overcomes low coolant flow rate performance that might otherwise be provided by only a single two-pass radiator system. The above-disclosed arrangement thus enhances system performance by providing comparatively lower charge air temperatures to the engine 12 at all operating conditions due to having the smaller secondary radiator 68 dedicated only to the aftercooler 16 circuit. Moreover, the above-disclosed two-pass primary radiator 20 further facilitates low coolant flow rates by providing high coolant flow velocity through its cooling tubes. Likewise, the above-disclosed two-pass aftercooler 16 provides relatively improved cooling of engine charge air at relatively low coolant flow rates.

While the particular TURBOCHARGED ENGINE COOLING SYSTEM WITH TWO TWO-PASS RADIATORS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. A cooling system for an engine, comprising:

at least a first radiator having at least one coolant outlet;

at least a second radiator having at least one coolant inlet in communication with the coolant outlet of the first radiator, the second radiator also having at least one coolant outlet, wherein coolant is passed in series from the first radiator to the second radiator;

at least one aftercooler having at least one coolant inlet in communication with the coolant outlet of the second radiator;

at least one pump communicating with the first radiator for pumping coolant to the engine; and at least one shunt tank disposed above the pump, a fluid line directly attached to both the tank and a suction of the pump such that the tank provides a static pressure head to the suction of the pump.

2. The system of claim 1, wherein the pump is a jacket water (JW) pump.

3. The system of claim 2, further comprising at least one separate circuit aftercooling (SCAC) pump in fluid communication with the first radiator, the SCAC pump pumping coolant from the first radiator to the aftercooler.

4. The system of claim 3, wherein the SCAC pump takes a suction on the outlet of the first radiator and discharges coolant to the inlet of the second radiator.

5. The system of claim 3, wherein the SCAC pump takes a suction on the outlet of the second radiator and discharges coolant to the inlet of the aftercooler.

6. The system of claim 1, wherein at least one of the radiators is a two-pass radiator.

7. The system of claim 1, in combination with an engine.

8. The combination of claim 7, in further combination with a vehicle.

9. A cooling system for an engine of a vehicle, comprising:

a first radiator;

a JW pump discharging coolant from the first radiator to the engine;

a second radiator in parallel with the engine and receiving coolant from the first radiator; and an aftercooler in series with the second radiator for receiving coolant therefrom, the aftercooler discharging coolant back to the first radiator; and at least one shunt tank disposed above the JW pump, a fluid line directly attached to both the tank and a suction of the pump such that the tank provides a static pressure head to the suction of the pump.

10. The system of claim 9, further comprising an SCAC pump for causing coolant to flow to the second radiator and aftercooler.

11. The system of claim 10, wherein the SCAC pump receives coolant from the first radiator and discharges coolant to the second radiator.

12. The system of claim 10, wherein the SCAC pump receives coolant from the second radiator and discharges coolant to the aftercooler.

13. The system of claim 9 wherein at least one of the radiators is a two-pass radiator.

14. The system of claim 9, in combination with an engine.

15. The combination of claim 14, in further combination with a vehicle.

16. A method for cooling an engine and an aftercooler cooling charge air for the engine, comprising:

pumping coolant from a primary radiator to the engine;

causing coolant from the primary radiator to flow in series through a secondary radiator and the aftercooler to cool charge air from a turbocharger; and providing a shunt tank in direct fluid communication with a suction of a pump to provide a static pressure head to the suction of the pump.

17. The method of claim 16, wherein at least one radiator is a two-pass radiator.

18. The method of claim 17, further comprising:

providing a static pressure head on a suction of the JW pump; and causing the JW pump to pump coolant from the primary radiator to the engine.

19. The method of claim 17, further comprising providing an SCAC pump and causing the SCAC pump to take a suction on the primary radiator and discharge coolant to the secondary radiator.

20. The method of claim 17, further comprising providing an SCAC pump and causing the SCAC pump to take a suction on the secondary radiator and discharge coolant to the aftercooler.

\* \* \* \* \*